Oct. 4, 1949.  D. D. GRIEG ET AL  2,483,410
WIDE BAND PROBE
Filed Oct. 30, 1945
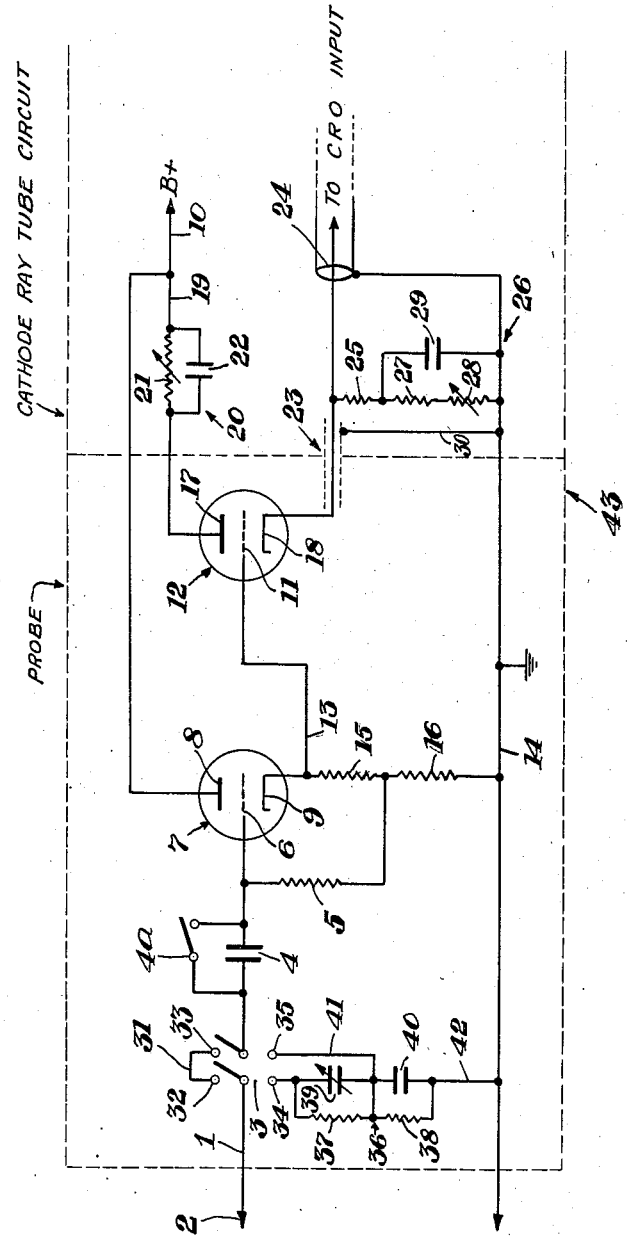
INVENTORS
DONALD D. GRIEG
ARNOLD M. LEVINE
LESTER DUBIN
BY
*Percy P. Lantzy*
ATTORNEY Patented Oct. 4, 1949

2,483,410

UNITED STATES PATENT OFFICE 2,483,410

WIDE BAND PROBE

Donald D. Grieg and Arnold M. Levine, Forest Hills, and Lester Dubin, Brooklyn, N. Y., assignors to Federal Telephone and Radio Corporation, New York, N. Y., a corporation of Delaware Application October 30, 1945, Serial No. 625,648

3 Claims. (Cl. 179—171)

1

This invention relates to wide band probes and more particularly for a probe for use in conjunction with cathode ray oscillographs for testing wide band video circuits in various applications.

Probes for the purpose stated as used heretofore generally utilize input resistance-capacitance attenuators to minimize the effect of the high capacity of the probe cable. However, this advantage is obtained at the cost of attenuation of the signal by a factor of many decibels.

It is an object of this invention to provide a probe of the character specified which possesses low input capacity and at the same time is productive of an overall loss many times less than that of the probes used in the past.

It is another object to provide a probe which makes use of two cathode followers in tandem.

Still another object is to provide a probe which is the cause of a minimum amount of loading on the circuits under test.

A still further object is to provide a probe which is operative over an extremely wide frequency band down to and including direct current without being the cause of deleterious characteristics due to the probe itself.

A further object is to provide a probe which has a substantially flat, substantially constant time delay characteristic over a wide band of frequencies including direct current.

In accordance with certain features of the invention a probe has been provided which offers a low input capacity which at the same time feeds a low impedance output cable. These requirements have been met by using two cathode followers in tandem. The input cathode follower circuit is of such a character as to offer a very high input impedance serving the dual function of meeting phase shift requirements and also reducing the effective input capacity. The output cathode follower is coupled directly to the first stage and is arranged to feed a low impedance coaxial cable. A selector switch in conjunction with the input stage makes it possible to feed the input cathode follower without attenuation in one position and in a second position to interpose an attenuator offering a given reduction in the input signal level. The output cathode follower circuit includes a phase correction network proportioned such as to result in a minimum of phase shift over a wide band.

These and other features and objects of the invention will become more apparent upon consideration of the following detailed description of the embodiment to be read in connection with the accompanying drawings in which the single figure represents a circuit diagram in schematic form of the probe embodying our invention.

Referring now to the drawing, the input to the probe is applied over an input lead 1 which is provided with a probe tip 2 and which by way of a double-throw double-pole switch 3 applies the input voltage over a coupling condenser 4 and a grid return resistance 5 to a grid 6 of a triode 7. If desired the condenser 4 may be by-passed, as indicated at 4a when direct current voltage is to be applied. The triode 7, further including a plate 8 and a cathode 9, is energized from a plate voltage supply B+ at 10 and is directly coupled to a grid 11 of an output cathode follower triode 12 from its cathode circuit by way of a connection 13. The cathode circuit of the triode 7 includes in its connection to a ground lead 14 a bias and load resistor 15 as well as an additional load resistance 16, the latter being comparatively large. The output triode 12 which includes a plate 17 and a cathode 18 receives its plate energizing voltage from the plate potential supply available at 10 over a lead 19, which includes a phase correction circuit 20 comprised of a variable resistor 21 and a capacitance 22. The output of the probe is obtainable from the circuit of the cathode 18 over a shielded coaxial cable 23 and may be applied to an indicator such as a cathode ray oscillograph over a connection 24. The output circuit of the cathode 18 includes a resistance 25 forming a matching termination impedance for the cable 23 and also a cathode bias and compensating network 26 which consists of biasing resistors 27 and 28 the latter being adjustable and a compensating capacitance 29. The usual ground connection is provided from the shielded cable 23 to the ground lead 14 by way of a connection 30. The input to the triode 7 may be applied directly by way of a jumper connection 31 when the switch 3 makes contact with terminals 32 and 33. When the switch 3 is contacting terminals 34 and 35 a capacitance compensated attenuator network 36 is brought into circuit with the input to the triode 7. The attenuator network comprises two resistances 37 and 38 the former in series with the input lead, the latter forming a connection to ground therefrom. These resistances are shunted by capacitance 39 and 40, respectively, the former being adjustable. Contact 35 forms the output terminal for the attenuator, over a connection 41. The attenuator network 36 is also connected to the ground lead 14 over a connection 42. The probe circuit is completely shielded as indicated by the broken lines at 43.

In operation it has been found that a comparatively large value for the cathode load resistances 15—16 should be chosen so as to provide a stage gain close to unity with a consequent reduction of the input capacity and a high effective input impedance. However, several limiting factors as to the size of the cathode load resistance have to be considered, the following stage being directly coupled. Thus, since the grid bias of the output stage depends on the voltage drop across the cathode load resistance 16, too large a value therefor would cause the drawing of large grid current and overloading of the input stage. It is also to be noted in connection therewith that the band width characteristic of a cathode follower is determined by a factor which is dependent on the ratio of the grid bias to the input voltage of the first stage. To obtain a minimum of phase shift at low frequencies the largest possible value of input coupling capacitator 4 is desired. Since the probe as a whole must offer a low input capacity the selection of an input cathode follower will offer a very high input impedance serving to meet phase shift requirements as well as reducing the effective input capacity. The direct coupling of the output cathode follower to the first stage avoids the use of frequency dependent coupling elements.

The input attenuator is a capacity compensated resistance divider network of a given ratio which is effective independent of frequency. The parameters of the attenuating network have been made such that the ratio of the capacitances is equal to that of the resistances insuring a zero phase shift and equal attenuation for all frequencies. The output cathode follower feeds a coaxial cable 23 having a given characteristic impedance which is terminated with matched impedance given by the resistance 25 in order to minimize reflections at high frequencies. This provides for a matching substantially equal to the impedance of the cable for all frequencies whereby reflections will be minimized.

In view of the fact that a large biasing resistance (27, 28) is necessary for the cathode 18 because of the direct coupling of the two cathode followers, the resistors 27, 28 are provided with a high frequency by-pass in the form of the capacitance 29, in order for the terminating impedance 25 to be effective at high frequencies. The phase shift introduced by this combination at low frequencies is substantially compensated by the time delay or phase correction network 29 in the plate circuit of the triode 17. In order to obtain a substantially flat overall time delay characteristic for the probe over a wide range of frequencies down to direct current, a suitable relationship is used wherein the ratio of the resistances in the networks 20 and 26 equals the ratio of the capacitances. Any necessary adjustment with the varying frequencies may be made by means of the two adjustable resistances 28 and 21.

While we have described above the principles of our invention in connection with specific apparatus, it is to be clearly understood that this description is made only by way of example and not as a limitation on the scope of our invention as defined in the objects and the accompanying claims.

We claim:

1. A wide band voltage probe, comprising a pair of cathode follower tubes in tandem, probing means, input control means disposed between said probing means and the first of said cathode followers, output circuit means for the second of said cathode followers, and phase correction network means operatively associated with said second follower comprising a bias resistor network for the cathode of said second follower compensated by capacitance and a time delay network including resistance and capacitance in the plate circuit of said second follower, the values of said resistances and capacitances of the said two correction networks being proportioned to make the ratio of the resistances of the two networks equal the ratio of the capacitances whereby a substantially constant overall time delay characteristic for the probe may be obtained over a wide frequency band including direct current.

2. A wide band voltage probe, comprising a pair of directly coupled cathode follower tubes in tandem, probing means, input control means associated with said probing means, a coupling network intermediate said input control and the first of said cathode followers, means for increasing the input impedance of said first follower, output circuit means for said second follower, matched terminating impedance means for said output circuit, high frequency by-passed biasing means for the cathode of said second follower in series with said terminating impedance, and a time delay compensating network in the plate circuit of said second follower to compensate for phase shift in the cathode circuit thereof, whereby a substantially flat overall time delay characteristic may be obtained over the frequency band used.

3. A probe according to claim 2 wherein said compensating network includes a phase shift adjustment means.

DONALD D. GRIEG.
ARNOLD M. LEVINE.
LESTER DUBIN.

REFERENCES CITED

The following references are of record in the file of this patent:

UNITED STATES PATENTS

| Number | Name | Date |
| --- | --- | --- |
| 1,613,422 | Wegel | Jan. 4, 1927 |
| 1,943,986 | Nyman | Jan. 16, 1934 |
| 2,185,870 | Smith | Jan. 2, 1940 |
| 2,252,613 | Bingley | Aug. 12, 1941 |

FOREIGN PATENTS

| Number | Country | Date |
| --- | --- | --- |
| 463,370 | Great Britain | Mar. 30, 1937 |